Jan. 20, 1959              D. L. RANKIN               2,869,322
FUEL CONTROL SYSTEM FOR GAS TURBINE ENGINES
UNDER STEADY-STATE OPERATING CONDITIONS
Filed Feb. 18, 1954                                   2 Sheets-Sheet 1

INVENTOR
DONALD L. RANKIN
BY
ATTORNEY

INVENTOR
DONALD L. RANKIN

United States Patent Office 2,869,322
Patented Jan. 20, 1959

2,869,322

FUEL CONTROL SYSTEM FOR GAS TURBINE ENGINES UNDER STEADY-STATE OPERATING CONDITIONS

Donald L. Rankin, Garden City, N. Y., assignor to Sperry Rand Corporation, a corporation of Delaware Application February 18, 1954, Serial No. 413,355

6 Claims. (Cl. 60—39.28)

(Filed under Rule 47(b) and 35 U. S. C. 118)

The subject of this invention is a fuel regulator system for an internal combustion engine. More particularly, this invention is designed to control the fuel flow or fuel pressure in accordance with prescheduled optimum operating conditions of a turbine type engine having means driven by the engine for supplying combustion air thereto at a pressure proportional to its speed of operation.

For particular types of engines, it may be desirable to control the liquid fuel flow and air-fuel combustible mixture in accordance with optimum operating conditions of one or more of the controlling elements of the engine. For example, in a given instance, it may be desirable to control the starting of an engine through one set of controls and then switch over to a running or normal operating control after starting has been achieved. Similarly, it may be desirable to switch over from a steady state operating control to an emergency control to meet a still different set of conditions which are distinct from both the starting and normal operating conditions.

In achieving the desired over-all results through the use of several such correlated control systems in a particular engine, usually one or more parameters or characteristics of the engine are availed of to most nearly approach ideal operating efficiency. Some systems employ electrical controls while others may employ combinations of hydraulic and electrical controls. The present system employs a manual and fluid pressure control for coarse adjustments and an electrical control for fine adjustments thereby obviating the possibility of complete lack of control due to failure or malfunction of the electrical portion of the system.

The object of the present invention is, therefore, to control the operation of an internal combustion engine of the character described during steady state conditions in accordance with optimum efficiency through means of fuel metering in response to known operating characteristics of the engine. An understanding of the present invention may be had from the explanation of the operation of the several embodiments illustrated, in which.

The present invention is concerned with the object of regulating fuel flow to the engine so that the correct amount of fuel will be delivered to the engine during steady state operating conditions causing the engine to operate in accordance with a predetermined optimum schedule of engine speed and turbine inlet temperature.

Figure 1:
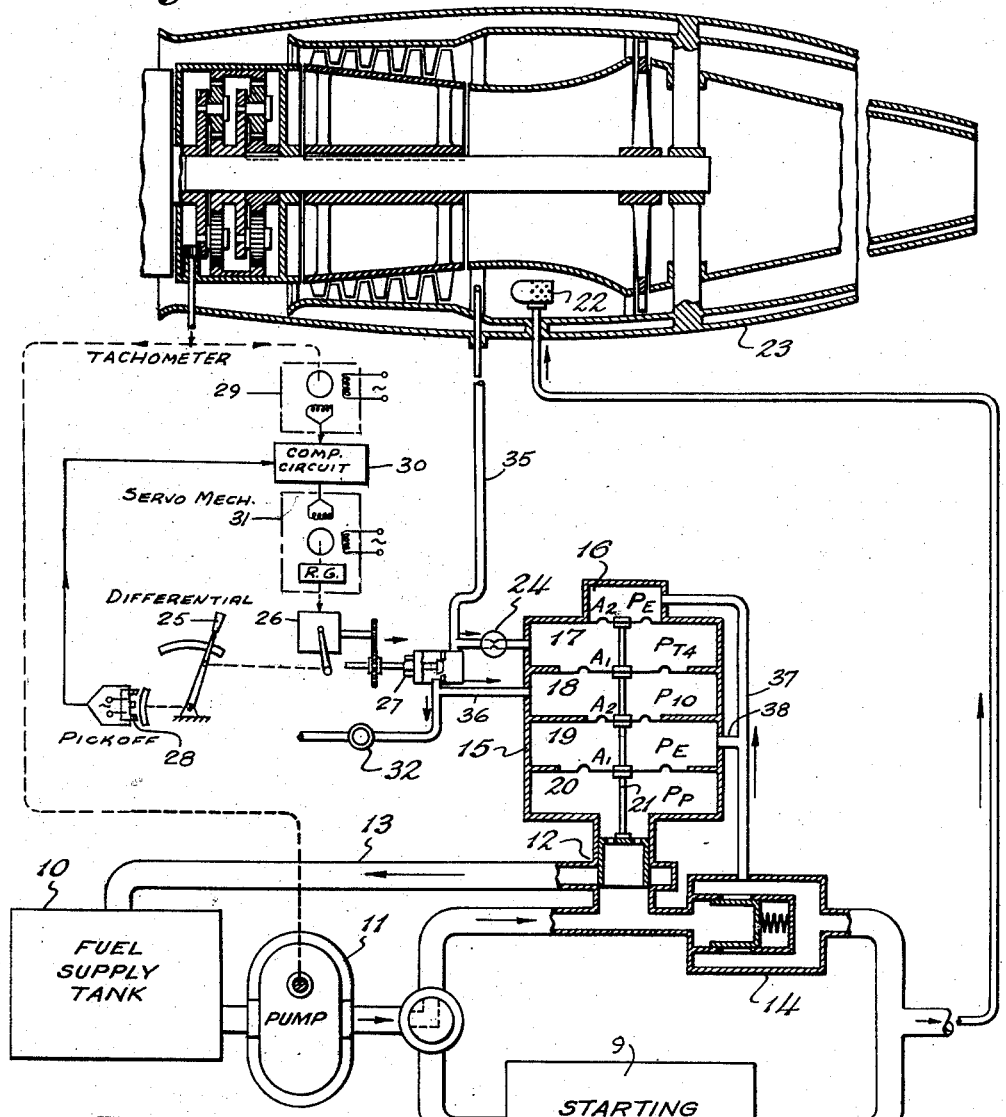
Fig. 1 is a schematic representation of a preferred embodiment of the present invention.

As illustrated by Fig. 1, fuel enters the regulator system from the fuel tank 10 and is pumped to the engine by a fuel pump 11. A variable by-pass device 12 regulates the fuel pressure realized at the output of the fuel pump by returning some of the fuel to the supply tank 10 through a by-pass connection 13. Fuel flow to the engine combustion chamber is metered by a variable area orifice device 14 which has the characteristic of causing a pressure drop directly proportional to the fuel flow therethrough.

The regulator employed in the embodiment illustrated in Fig. 1 comprises the diaphragm stack or compartmented means shown at 15. This device has a number of chambers 16, 17, 18, 19 and 20. Each compartmented chamber has an area (designated as $A_1$ and $A_2$) which is pressure responsive and is operably connected to a common actuator or linkage 21 so as to provide a single output signal in response to the total pressure differential exerted as a result of the several fluid pressures within the respective chambers of the diaphragm stack.

It will be recalled that the fuel pump 11 feeds fuel under pressure to a fuel pump by-pass 12 so that a portion of the fuel is pumped through a return connection 13 to its supply tank 10. The starting fuel control 9 illustrated schematically also receives the fuel pump pressure and operates in a manner disclosed in a copending application S. N. 399,190, filed December 21, 1953, entitled, "Fuel Metering System for Starting Gas Turbine Engines," and filed in the name of A. J. Sipin. The fuel pump pressure, $P_p$, is received in the lowermost chamber 20 of the diaphragm stack 15. The amount of fuel which is not returned to the supply tank 10 by way of the fuel pump by-pass 12 is delivered to a metering device 14. This metering device has a characteristic of causing a pressure drop directly proportional to fuel flow. This characteristic may also be stated as permitting fuel flow through the variable area orifice in proportion to the pressure differential thereacross. The output of the metering device supplies fuel to the combustion chamber 22 of a turbine type engine 23. The same fuel pressure exerted at the engine $P_E$ is also supplied to the first and fourth chambers, 16 and 19 respectively, of the diaphragm stack 15.

The second chamber 17 of the diaphragm stack 15 is arranged and connected to receive compressor outlet pressure $P_{T4}$. The connection to the second chamber may also include a fixed damping restriction as shown schematically at 24. The third chamber 18 of the diaphragm stack 15 receives the compressor outlet pressure $P_{T4}$ modified by a predetermined optimum operating condition of the engine to produce a fourth pressure designated as $P_{10}$. In the present embodiment, the predetermined optimum operating condition of the engine which is employed to modify the compressor outlet pressure $P_{T4}$ is a selected setting of a desired rotational speed of the engine for optimum power efficiency. This latter adjustment is achieved by a manually selected setting of a power lever which determines both temperature and rotational speed proportioned in accordance with a predetermined schedule for optimum efficiency in terms of power output.

The embodiment disclosed and illustrated in Fig. 1 operates in the following manner. The settable control lever 25 is manually adjusted at a selected setting for a particular desired power output of the engine. Through mechanical linkage including a suitable differential means 26 with two inputs and an output, valve 27 is so adjusted that its outlet pressure is a modified version of its inlet pressure metered in accordance with the manual setting of the settable control lever 25. Since the inlet pressure to this valve is the compressor outlet pressure $P_{T4}$, its outlet pressure then is the compressor outlet pressure modified in proportion to the selected setting of the settable control lever and designated as $P_{10}$. Lever 25 is operatively connected to the differential means 26 to provide one of its inputs.

A restriction shown as a fixed nozzle 32 in the exhaust connection to the valve 27 of Fig. 1 is characterized as permitting a critical flow therethrough so that the functions of the valve 27 are not impaired regardless of the ambient exhaust pressure. The particular requirements of the nozzle 32 are, of course, dependent upon the design of the embodiment in which it is utilized.

The settable control lever 25 is also connected to an electrical pick-off 28 which produces a signal proportional to the selected setting of the settable control lever 25. The pick-off 28 may be a conventional E-type wound electromagnetic stator and movable armature electrical signal generator whose central leg winding is energized from a conventional A. C. source. See element 19 in Figures 1 and 5 of U. S. Patent 2,724,564, issued November 22, 1955 to J. C. Newton et al., for a device of this type. A tachometer 29, connected to the turbine of the engine 23 by appropriate means, senses the rotational speed of the turbine and produces a signal as a function thereof. The pick-off signal and tachometer signal are compared in a comparison circuit 30 and the output is utilized to control a servomechanism 31 which provides one of the inputs to the differential 26. This latter unit is the same differential whose output is connected to the valve 27 and the control lever 25. In effect, manual adjustment of the control lever 25 operates upon the valve 27 through the differential 26 and modifies the inlet pressure $P_{T4}$ in accordance with that particular setting. The speed of the turbine is sensed by the tachometer 29 and compared with the signal corresponding to the particular chosen control lever setting so that through means of the servomechanism loop and the differential, the flow dividing valve 27 is continuously controlled in accordance with the instantaneous rotational speed of the turbine.

The compressor outlet pressure $P_{T4}$ is fed to the second chamber 17 of the diaphragm stack by way of conduit means or pipe 35 and the same pressure modified in accordance with the selected setting of the control lever and the speed of the engine, $P_{10}$, is fed to the third chamber 18 of the diaphragm stack 15 by way of conduit means or pipe 36. Fuel pump pressure $P_p$ is received in the lowermost or fifth chamber 20 of the diaphragm stack 15 and engine fuel pressure $P_E$ is received in the first and fourth chambers 16 and 19, respectively through the connecting conduit means or pipes 37 and 38.

The effective pressure responsive areas of the diaphragm stack 15 may be designated as $A_1$ and $A_2$ as shown in Fig. 1 and are so arranged with respect to each other that the fuel flow to the engine combustion chamber is dependent upon the difference between the compressor outlet pressure and a pressure which is a measure of the selected predetermined rotational speed of the engine desired for optimum operating efficiency for the setting of the control lever.

If it is assumed that $W_f$ is fuel flow in pounds per unit of time, the relation of fuel flow to the controlling pressures involved may be expressed by the equation, $$W_f = K(P_P - P_E) \quad (1)$$

where $(P_P - P_E)$ is the pressure drop across the variable area metering orifice having the characteristic previously described, and K is a constant. If the pressure responsive diaphragms have effective areas $A_1$ and $A_2$ as designated in Fig. 1 and are rigidly connected to a common linkage of the diaphragm stack to control the fuel pump by-pass, the following analysis of the over-all resultant operation of the regulator may be made. Equating the equilibrium of the forces on the common linkage by arbitrarily assigning positive forces as being exerted upwardly, $$-P_E A_2 + P_{T4} A_2 - P_{T4} A_1 + P_{10} A_1 - P_{10} A_2 + P_E A_2 - P_E A_1 + P_P A_1 = 0$$

The $P_E A_2$ terms cancel out.
Rearranging terms $$A_1(P_{T4} - P_{10}) - A_2(P_{T4} - P_{10}) = A_1(P_P - P_E)$$

$$(P_{T4} - P_{10})(A_1 - A_2) = A_1(P_P - P_E)$$

$$P_{T4} - P_{10} = \frac{A_1}{A_1 - A_2}(P_P - P_E) \quad (2)$$

Restating Equation 1

$$W_f = K(P_P - P_E) \quad (1)$$

And now defining K as $$K = \frac{A_1 C}{A_1 - A_2} \quad (3)$$

Where C is a constant, it follows that $$C(P_{T4} - P_{10}) = W_f \quad (4)$$

Thus, it is seen that the fuel pressure to the combustion chamber of the engine is regulated in response to the instantaneous differential between the compressor outlet pressure and a pressure representative of the desired R. P. M. of the engine which will effect optimum power efficiency as determined in accordance with a prearranged schedule.

Figure 2:
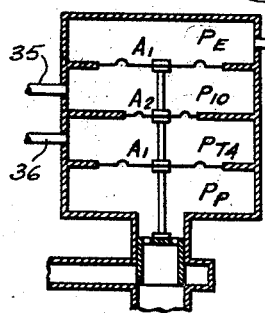
Fig. 2 is a schematic illustration of a modification of the fuel regulator of Fig. 1.

Fig. 2 illustrates an alternate form of the regulator employing four pressure responsive chambers as compared to the five shown in the embodiment of Fig. 1. The same type of control is had by feeding fuel pump pressure to the fourth or lower chamber of the diaphragm stack of Fig. 2, compressor outlet pressure to the third chamber, compressor outlet pressure modified in accordance with the operating parameter of the engine to the second chamber, and by feeding the engine combustion chamber intake pressure to the first or top chamber of the diaphragm stack of Fig. 2.

The operation of the regulator of Fig. 2 is identical to that of the regulator of Fig. 1 in respect to the linkage commonly connected to the several pressure responsive diaphragms within the stack and the regulating control of the fuel pump bypass resulting therefrom.

In particular applications of control systems designed to operate in accordance with the present invention, the five chamber type of diaphragm stack regulator may possibly lend itself more readily to production than the four chamber diaphragm stack. For instance, in the latter-mentioned embodiment of the regulator, the area $A_2$ may be considerably more critical than in the five chamber embodiment and therefore precisely accurate regulation and control of an engine may be more difficult to achieve with a four chamber regulator than with a five chamber regulator manufactured by the same production methods.

Figure 3:
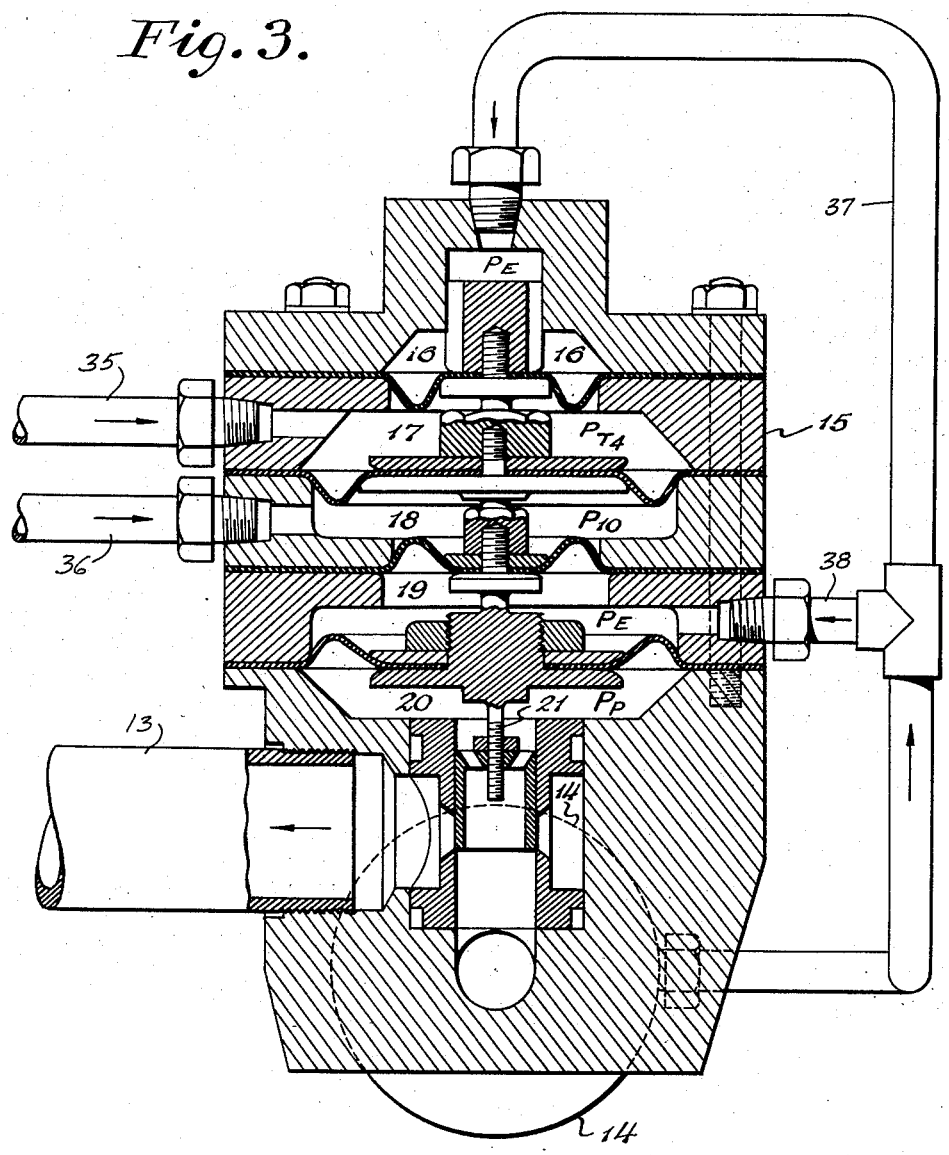
Fig. 3 is a cross-sectional view of the fuel regulator of Fig. 1.

Fig. 3 is a cross-sectional view of a typical diaphragm stack embodiment of the regulator 15 which is schematically illustrated in Fig. 1. It will be noted that the top chamber 16 is arranged by suitable connections to receive engine pressure, $P_E$, as also is the fourth chamber 19 of the diaphragm stack 15. The engine pressure $P_E$ is produced at the outlet of a variable orifice metering device shown at 14. The compressor outlet pressure $P_{T4}$ is connected to the second chamber 17 and the compressor outlet pressure modified by a desired operating parameter of the engine $P_{10}$ is received in the third chamber 18. The lowermost or fifth chamber 20 receives fuel pump pressure $P_p$ and the fuel pump by-pass device 12 shown in Fig. 1, is arranged to be operated by the commonly connected linkage 21 which is adapted to respond to the over-all differential in pressure exerted by the pressure responsive areas of the chambers in the stack.

To afford further adjustment of the diaphragm stack in either embodiment, a compression spring may be employed to adjust the top portion of the top chamber, for instance.

Apparatus constructed in accordance with the teachings of the present invention will produce a ruggedized and thoroughly reliable fuel flow regulator system which will accurately and automatically control fuel flow throughout the relatively small span of rotational speeds during steady state operation of turboprop type engines, for instance, in which the several parameters of operating conditions of the engine are critical and must be very finely adjusted for optimum power output efficiency. Though admirably suited to use in conjunction with turbo-prop engines, the inference should not be taken, however, that the present invention is restricted to such use for it may be employed to advantage with jet engines, as well, for example.

Another feature of the present invention resides in the arrangement by which the manual adjustment of the control lever 25 effects a coarse adjustment of the control valve 27 and thereby adjusts the operation of the diaphragm stack 15 and controls the fuel metered to the engine 23. In the event that the fine control of the regulator 15 afforded by means of the servomechanism drive 31 is not operative due to electrical failure, malfunction of the servomechanism loop or other difficulty, the control and regulation of fuel may still be effected by manual adjustment of control lever 25. Insofar as the electrical portion of the fuel regulation and control is concerned, a system arranged to operate in accordance with the present invention is therefore fail safe, because in the case of electrical failure, the system will always afford adequate emergency control through wholly manual and fluid pressure adjustment and regulation.

A most important advantage offered by the present invention is that feature by which fuel regulation is automatically adjusted in response to ambient pressure of the engine regardless of whether the fine adjustment of the electrical servomechanism portion of the control is functioning or not. The ambient pressure or compressor inlet pressure effects the compressor outlet pressure which in turn has an effect upon the balance of the fluid pressures fed to the compartmented chambers of the diaphragm stack.

Therefore, fuel regulation by use of a system which operates in accordance with the present invention is always automatically responsive to changes in ambient pressure. This feature further enhances the degree of fuel and power control which may be achieved through manual adjustment because the pilot is greatly aided by the automatic compensation for change in ambient temperature, although the fine control of the electrical servomechanism may be disabled in part or in whole.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A fuel control system for a gas turbine engine of the type having means driven by the engine for supplying combustion air thereto at a pressure proportional to its speed of operation, including a fuel pump, a fuel flow conduit connected to said pump for delivering fuel to the engine, a variable area orifice metering device in said fuel conduit providing a fluid pressure drop across the orifice thereof that is proportional to the fuel flow therethrough, means for regulating the input flow of fuel to the device comprising a fuel bypass valve between the pump and device including a plurality of flexible diaphragms dividing the interior of said regulating means into a plurality of compartments, a common link interconnecting the diaphragms of said regulating means and connected to control the fuel bypass valve, a first of said compartments being connected to said fuel conduit on the input side of the metering device for receiving fuel from the pump at a first pressure, a second of said compartments being connected to said fuel conduit on the output side of the metering device for receiving fuel from the pump at a second pressure, an air flow conduit having an open end and an end connected to the engine to receive air at the pressure of the combustion air of the engine, an adjustable valve in said air flow conduit for dropping the pressure therein, a third of said compartments being connected to said air flow conduit on the input side of said air flow valve for receiving air at a third pressure, a fourth of said compartments being connected to said air flow conduit on the output side of said air flow valve for receiving air at a fourth pressure less than the pressure on the input side of the air flow valve, the respective areas of the diaphragms of said regulating means being such that the fluid pressure differential across the metering device provides a force for driving the common link in one direction and the air pressure differential across said air flow valve provides an equal and opposite force in the other direction to normally maintain the link in a balanced condition, differential means with two inputs and an output for adjusting said air flow valve to change the pressure drop in said air flow conduit, a manually settable lever operatively connected to said differential means providing one of the inputs thereto, and means providing the other of the inputs to said differential means operable in accordance with the speed of operation of the engine.

2. A fuel control system for a gas turbine engine of the type having means driven by the engine for supplying combustion air thereto at a pressure proportional to its speed of operation, including a conduit for supplying fuel to the engine, a fuel pump for the supply conduit, a fuel by-pass conduit connected to the supply conduit having a by-pass control valve, a differential metering device in the supply conduit downstream of said by-pass control valve controlling the supply of fuel from the pump to the engine in accordance with the difference in the fuel pressure between its intake and output, compartmented means including a plurality of independent pressure chambers and a common actuator operatively connected to said by-pass control valve; means for operating said by-pass valve actuator to control the intake pressure at said metering device and thereby the supply of fuel to the engine having first differentially effective means including first conduit means to said compartmented means supplying combustion air under pressure from the engine to one of the chambers, a second conduit means to said compartmented means connecting a second pressure chamber to said first conduit means through an adjustable pressure reducing valve, second differentially effective means including third conduit means to said compartmented means connecting the supply conduit on the intake side of said metering device to a third chamber, fourth conduit means to said compartmented means connecting the supply conduit on the output side of said metering device to a fourth chamber; differential means having two inputs and an output connected to adjust said pressure reducing valve to control the pressure in said second chamber, a manually settable control lever, means providing one of the inputs to said differential means having an operative connection to said manual control lever, and means providing the other of the inputs to said differential means operable in accordance with the speed of operation of the engine.

3. A fuel control system as set forth in claim 2, in which said compartmented means includes a fifth chamber, and fifth conduit means connecting the supply conduit on the output side of said metering device to the fifth chamber.

4. A fuel control system for a gas turbine engine of the type having means driven by the engine for supplying combustion air thereto at a pressure proportional to its speed of operation, including a conduit for supplying fuel to the engine, a fuel pump for the supply conduit, a fuel by-pass conduit connected to the supply conduit having a by-pass control valve, a differential metering device in the supply conduit downstream of said by-pass control valve controlling the supply of fuel from the pump to the engine in accordance with the difference in the fuel pressure between its intake and output, compartmented means including a plurality of independent pressure chambers and a common actuator operatively connected to said by-pass control valve; and means connected to effect differential operation of said by-pass valve actuator to control the intake pressure at said metering device and thereby the supply of fuel to the engine including first conduit means to said compartmented means supplying combustion air under pressure from the engine to one of the chambers, a second conduit means to said compartmented means connecting a second pressure chamber to said first conduit means through an adjustable pressure reducing valve, differential means having two inputs and an output connected to adjust said pressure reducing valve to control the pressure in said second chamber, a manually settable control lever, means providing one of the inputs to said differential means having an operative connection to said manual control lever, and means providing the other of the inputs to said differential means operable in accordance with the speed of operation of the engine.

5. A fuel control system for a gas turbine engine of the type having means driven by the engine for supplying combustion air thereto at a pressure proportional to its speed of operation, including a conduit for supplying fuel to the engine, a fuel pump for the supply conduit, a fuel by-pass conduit connected to the supply conduit having a by-pass control valve therein effective to control the supply of fuel from the pump to the engine, compartmented means including a plurality of independent pressure chambers and a common actuator operatively connected to said by-pass control valve; and means connected to effect differential operation of said by-pass valve actuator to control the supply of fuel to the engine including first conduit means to said compartmented means supplying combustion air under pressure from the engine to one of the chambers, second conduit means to said compartmented means connecting a second pressure chamber to said first conduit means through an adjustable pressure reducing valve, differential means having two inputs and an output connected to adjust said pressure reducing valve to control the pressure in said second chamber, a manually settable control lever, means providing one of the inputs to said differential means having an operative connection to said manual control lever, and means providing the other of the inputs to said differential means operable in accordance with the speed of operation of the engine.

6. A fuel control system as set forth in claim 5, including third conduit means connected to the output end of said pressure reducing valve, and a nozzle venting to the atmosphere in said third conduit means.

References Cited in the file of this patent

UNITED STATES PATENTS

| | | |
|---|---|---|
| 2,405,888 | Holley | Aug. 13, 1946 |
| 2,667,743 | Lee | Feb. 2, 1954 |
| 2,668,416 | Lee | Feb. 9, 1954 |